United States Patent [19]

Cuthbertson et al.

[11] Patent Number: 5,366,668
[45] Date of Patent: Nov. 22, 1994

[54] POLYMERIC BIFOCAL LENS PRODUCTION PROCESS

[75] Inventors: Matthew J. Cuthbertson, Colonel Light Gardens; Philip H. Squires, Reynella, both of Australia

[73] Assignee: Pilkington Visioncare Inc., Menlo Park, Calif.

[21] Appl. No.: 981,419

[22] Filed: Nov. 25, 1992

[30] Foreign Application Priority Data

Nov. 29, 1991 [GB] United Kingdom ............ 91/25480.5

[51] Int. Cl.$^5$ .................................................. B29D 11/00
[52] U.S. Cl. ................................... 264/1.8; 264/2.7
[58] Field of Search .......................... 264/1.7, 1.8, 2.7

[56] References Cited

U.S. PATENT DOCUMENTS

| | | | |
|---|---|---|---|
| 2,339,433 | 1/1944 | Staehle | 264/1.7 |
| 3,248,460 | 4/1966 | Naujokas | 264/1.7 |
| 3,763,290 | 10/1973 | Sheld | 264/1.7 |
| 4,190,621 | 2/1980 | Greshes | 264/1.8 |
| 4,279,401 | 7/1981 | Ramirez et al. | 264/1.8 |
| 4,432,832 | 2/1984 | Fantone | 264/1.7 |
| 4,623,496 | 11/1986 | Verhoeven et al. | 264/1.7 |
| 4,957,663 | 9/1990 | Zwiers et al. | 264/1.7 |

FOREIGN PATENT DOCUMENTS

| | | |
|---|---|---|
| 80556/87 | 6/1988 | Australia . |
| 596659 | 4/1960 | Canada ................................... 264/1.7 |
| 0209382 | 1/1987 | European Pat. Off. . |
| 2294990 | 7/1976 | France . |
| 2383002 | 10/1978 | France . |
| 2600174 | 12/1987 | France . |

*Primary Examiner*—Mathieu Vargot
*Attorney, Agent, or Firm*—Howrey & Simon

[57] ABSTRACT

A polymeric bifocal lens production process including the steps of selecting a single vision lens or lens blank with a convex surface, and a bifocal mould with a smaller radius of curvature; toughening the convex surface of the lens or lens blank; assembling the mould and lens or lens blank with catalysed monomer between the mould and the lens or lens blank; holding the lens or lens blank and the mould in position relative to one another so that the lens or lens blank contacts the mould; curing the monomer; removing the mould and post-curing to relieve stress in the bifocal lens and to allow the cured monomer to shrink in a controlled manner thereby causing a power decrease in the bifocal segment, whereby the cured monomer cast on to the lens or lens blank is of higher refractive index than the lens or lens blank.

10 Claims, 1 Drawing Sheet

POLYMERIC BIFOCAL LENS PRODUCTION PROCESS

BACKGROUND TO THE INVENTION

This invention relates to a polymeric bifocal lens production process in which a single-vision polymeric ophthalmic lens or lens blank has a second polymeric front surface cast onto it.

Throughout this specification, the term "single vision lens blank" means a finished or semi-finished lens blank having a nominally spherical convex front surface; the term "bifocal lens" means a lens which is a bifocal, a special bifocal with progressive power in the bifocal segment, or similar adaptation. It has long been recognised that the casting of a thermo-setting polymer to make a lens entails shrinkage during the polymerisation stage, typically resulting in a 15 percent reduction in volume of the lens. It has been proposed to use flexible moulds in order to accommodate this shrinkage and ensure that the moulds remain in contact with the lens during polymerisation to give a good optical surface. In U.S. Pat. No. 3248460 Naujokas has suggested that a new front surface of polymeric material can be cast onto a lens which has small surface defects attributable to shrinkage. He describes a method of casting a thin layer of polymeric material, having the same refractive index as that of the lens, onto the front surface of the lens to provide a means of recovering a lens having a major surface defect which is a more economical means than the normal polishing operation. In U.S. Pat. No. 4190621 Greshes has disclosed a process for manufacturing bifocal polymeric ophthalmic lenses by casting onto the front surface of a single vision lens. He casts a thin film onto the single vision lens to avoid further shrinkage problems during cure of that film. The patent describes the provision to a laboratory of a single vision lens which already contains the distance portion and the astigmatic correction together with the provision of a bifocal mould, which has the same radius of curvature as the front surface of the lens. The mould has a recessed portion so that two different thicknesses of film can be deposited on the lens. A small amount of catalysed monomer is deposited in the bifocal mould, held concave surface up. The single vision lens is then placed in the mould and spreads the liquid so that it completely fills the space between the lens and the mould. The lens is supported above the mound to hold the astigmatic correction at its proper angle, and to provide decentration of the bifocal portion. The assembly is then cured after which it is cooled and the lens is removed. Greshes does not disclose any particular method for preparing the single vision lens for the subsequent casting process, however, he does disclose that a major cause of lens failure was insufficient adhesion between the cast on portion and the original single vision base lens.

Published Australian patent application number PH 80566/87 discloses a lens production process in which a single vision polymeric ophthalmic (base) lens is prepared, and subsequently has a second polymeric front surface cast onto it. After removing any unwanted cylinder the base lens is prepared by roughening the surface of the lens by either chemical or physical means to assist the adhesion of the cast on layer. A concave bifocal mould is then chosen which has the same radius of curvature as the lens. Catalysed monomer is then injected onto the mould and evenly distributed by pressing down the base lens into the monomer. The base lens and mould are then held in the desired relative positions by a jig and the assembly is cured in an air oven or by ultra-violet radiation, The second polymeric front surface is preferably of the same refractive index as the base lens. However this method is not wholly satisfactory. For instance the monomer at the edge is subject to air inhibition and the polymer formed there is undercured. Further the cast on segment develops a gross optical defect along the top of the segment, this has been found to be due to shrinkage of the segment portion during and after curing. This shrinkage is also responsible for the assembly separating during the cure, i.e. the polymer separates from the mould.

SUMMARY OF THE INVENTION

It is an aim Of this invention to provide a reliable process for producing bifocal lenses which overcomes the difficulties mentioned above. It is a further aim of this invention to provide a process for producing bifocal lenses which have the desired lens powers.

According to the present invention there is provided a polymeric bifocal lens production process including the steps of selecting a single vision lens or lens blank, with a convex surface, and a bifocal mould with a smaller radius of curvature; roughening the convex surface of the lens or lens blank, assembling the mould and lens or lens blank with catalysed monomer between the mould and the lens or lens blank; holding the lens or lens blank and the mould in position relative to one another so that the lens or lens blank contacts the mould; curing the assembly; removing the mould and post-curing to relieve stress in the bifocal lens and to allow the cured monomer to shrink in a controlled manner thereby causing a power decrease in the bifocal segment. Preferably, the cured monomer cast on to the lens or lens blank is of higher refractive index than the lens or lens blank.

Using such a process a variety of lens powers can be generated from a single blank (or lens) mould combination. However the present invention also includes the case where the power decrease caused by the shrinkage of the bifocal segment is substantially compensated for by the greater refractive index of the higher index polymer.

The process may further include the step of back surfacing the lens after post cure.

BRIEF DESCRIPTION OF THE DRAWINGS

The invention will now be described, by way of example only, with reference to the following drawings, in which.

DETAILED DESCRIPTION OF THE PREFERRED EMBODIMENTS

Figure 1:
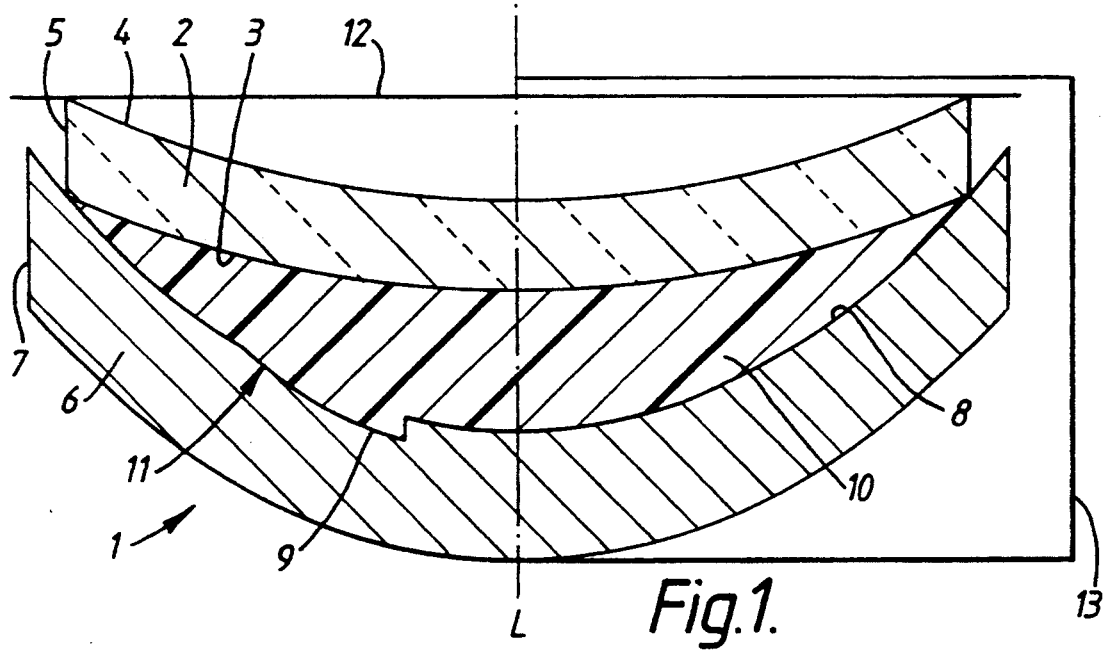
FIG. 1 is a diagrammatic cross-section of a front-surface casting assembly, according to the present invention, ready for curing.

FIG. 1 shows a front surface casting assembly 1 comprising a circular semi-finished lens blank 2 with a convex front surface 3, a concave back surface 4 and a periphery 5. Although the process is described using a semi-finished lens blank a finished lens may also be used. Also shown is a circular bifocal lens mould 6 which is of greater diameter than blank 2. The blank 2 and mould 6 each have their own optical axis. The periphery 5 of the front surface 3 contacts the lens mould 6 near its periphery 7. The lens mould 6 has a concave optical surface 8 including a segment mould 9. The convex front curve 3 of blank 2 has a greater radius of curvature than the of concave surface 8 of mould 6. The radius of curvature of surface 8 of mould 6 is determined irrespective of the segment portion 9. There is therefore a gap between the mould 6 and the blank 2 along the line L, this gap is the centre gap when the optical axes of the blank 2 and mould 6 are substantially aligned.

Figure 2:
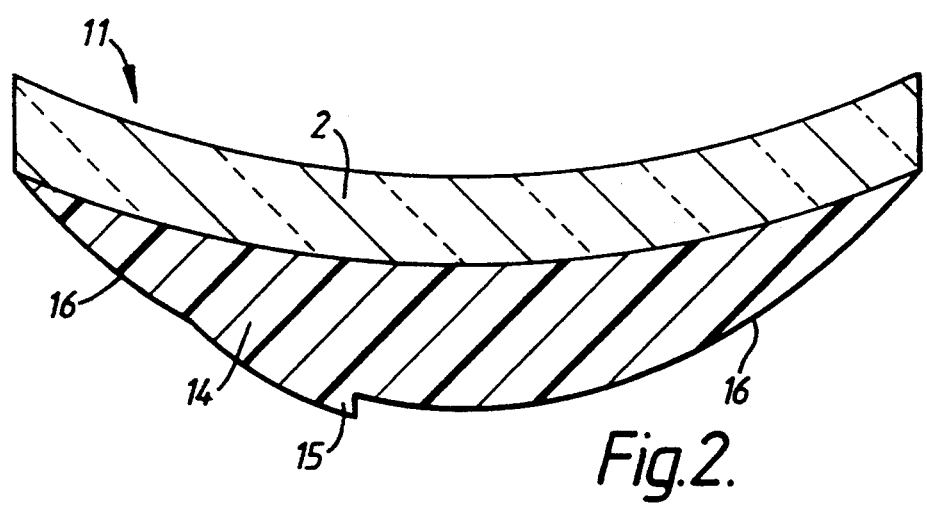
FIG. 2 is a diagrammatic cross-section of a lens blank with a front surface cast on to it according to the present invention.

The surfaces 3 and 8 of blank 2 and mould 6 respectively, define a volume 10 which is filled with a plastic monomer material and initiator. The blank 2 together with the monomer and initiator in the volume 10 will comprise lens 11 as shown in FIG. 2. The periphery 5 of concave surface 4 of blank 2 contacts a flat plate 12.

The front surface casting assembly 1 is held by clamping means 13. The clamping means 13 applies a compressive force between the mould 6 and the flat plate 12.

The lens 11 is shown more clearly in FIG. 2 in which is shown lens blank 2 with a polymeric front surface 14 cast on to it. The front surface 14 having two areas of primary interest, a segment portion 15 producing a near segment power, formed from the segment mould portion 9, and a distance portion 16 which is effectively the rest of the front surface 14 producing a distance power.

The process steps in producing the front surface cast bifocal lens 11 are as follows. A blank 2 is used together with an appropriate mould 6, the mould 6 is selected as outlined below. The front surface curve 3 of blank 2 is ground to have a radius of curvature greater than that of the concave optical surface 8 of mould 6. The grinding serves several purposes. It allows the periphery 5 of blank 2 to contact the mould 6 near its periphery 7, thus sealing in the monomer, this prevents air inhibiting the cure of the peripheral parts of the front surface 14. The greater radius of curvature of the blank 2 substantially reduces the shrinkage distortion of the segment portion 15 which occurs during curing by increasing the centre gap between the mould 6 and blank 2, this has the added advantage of greatly reducing the likelihood that the assembly 1 will separate during the cure. Also the front surface 3 is left with a rough finish, approximately equivalent to that resulting from abrasion with 1200 grit emery paper, this helps facilitate adhesion in the subsequent front surface casting process. This toughening may be achieved by other, e.g., chemical, means but it is most convenient to combine it with the grinding at this stage, The curvature of the blank 2 is ground so that the centre gap is about 1.5 mm, If the centre gap is significantly less than about 1.5 mm then a "ridge" distortion appears in the distance section of the lens. If the centre gap is significantly greater than about 1.5 mm then when the resultant lens is back surfaced to a centre thickness of, say, about 1.7 mm to about 1.8 mm then the front, cast on, layer may be exposed. This could lead to difficulties in further processing, such as tinting.

Sufficient monomer, with the appropriate amount of initiator, is deposited on the mould 6 to ensure the volume 10 is filled. For instance, for a 1.50 mm centre thickness the amount of monomer required will typically be about 4 $cm^3$ depending on the dimensions of the blank 2 and mould 6. A cast-on layer of this thickness will undergo some shrinkage after the initial cure as the residual stress in the cured lens is released, generally this shrinkage occurs during the post cure and is of the order of a 10% shrinkage by volume.

The result of this difference in shrinkage is that the new front surface of the lens does not have the same radius of curvature as the mould 6, this results in incorrect distance and segment powers in the lens 11. It has been found that this shrinkage can be predicted for a given mould combination reasonably accurately. Therefore to compensate for the change in the distance and segment powers which arise from this shrinkage a cast-on layer with a higher refractive index than the lens blank is used. Because, the shrinkage can be adequately predicted the necessary high refractive index monomer and mould 6 can be used to achieve the required segment power. A range of refractive indices can be obtained by mixing ethoxylated bisphenol A dimethacrylate with polyethylene glycol dimethacrylate. Using the predictable manner in which the monomer shrinks during the post-cure, together with the of indices available using other monomers a variety of lens powers may be produced from a single mould/lens combination instead of merely compensating for the monomer shrinkage using the high index monomer.

The blank 2 is then placed over the mould 6 and manipulated into the correct orientation with respect to the mould 6 such that the optical axis of the blank 2 is co-axial with the optical axis of the mould 6. Flat plate 12 is then placed over the blank 2 and clamped in place by clamping means 13. The flat plate 12 ensures that the clamping force is directed through the periphery 5 of blank 2, air is therefore prevented from reaching the high index monomer and inhibit curing. Clamping near the centre of blank 2 can also cause the blank 2 to deform slightly, reducing the accuracy of the front surface cast lens 11.

The assembly 1 is then placed in a hot air oven (not shown) to cure the monomer. A typical curing cycle is shown in table 1, this will alter with different monomers.

TABLE 1

| TIME (mins) | TEMP (°C.) |
|---|---|
| 0 | 45 |
| 15 | 50 |
| 30 | 55 |
| 45 | 55 |
| 60 | 60 |
| 75 | 70 |
| 90 | 75 |

The assembly 1 is then removed from the curing oven. The assembly 1, at all times from its removal from the oven to its disassembly, is maintained at a temperature high enough to ensure the assembly 1 does not separate once the clamping means 13 is removed. Typically the temperature must be maintained above 60° C.

Excess monomer is washed off prior to opening to avoid it being sucked onto the surface of the lens 11 when the assembly 1 is opened. The assembly 1 is opened from the nasal side to avoid damaging the segment portion 15 of the lens 11.

The cured lens 11 is then moved onto the post-cure stage. A typical post-cure is as follows:
 (i) Heat steadily up to 100° C. over 1 hour
 (ii) Maintain at 100° C. for 4–5 hours
 (iii) Cool slowly to 60° C. or below Using a mixture of ethoxylated bisphenol A dimethacrylate and polyethylene glycol dimethacrylate the lens 11 may need to be hard coated to ensure it is sufficiently scratch resistant. It has, however, been found that a small error remains in the distance power, typically −0.05 Dioptres to −0.1 Dioptres. The lens 11 may then be sent to the back surfacing stage to accurately produce the desired lens thickness and remove the residual distance power error in the distance portion 16. It will be appreciated that this technique provides advantages of a considerable reduction in the number of moulds that need to be available to manufacture bifocals.

Alternatively a dedicated set of moulds for front surface casting may be produced. For a given refractive index moulds may be produced that will give the correct lens powers, taking into account the known shrinkage of the monomer as mentioned above. In this manner the lens blank may conveniently be of the same refractive index as the cast-on portion.

What is claimed is:

1. A polymeric bifocal lens production process including the steps of selecting a single vision lens or lens blank with a convex surface, and a bifocal mould with a smaller radius of curvature; toughening the convex surface of the lens or lens blank; assembling the mould and lens or lens blank with catalysed monomer between the mould and the lens or lens blank; holding the lens or lens blank and the mould in position relative to one another so that the lens or lens blank contacts the mould along a periphery of the lens or lens blank; curing the monomer; removing the mould and post-curing to relieve stress in the bifocal lens and to allow the cured monomer to shrink in a controlled manner thereby causing a power decrease in the bifocal segment.

2. A process according to claim 1 wherein the cured monomer cast on to the lens or lens blank is of higher refractive index than the lens or lens blank.

3. A process according to claim 2 in which the power decrease caused by the shrinkage of the bifocal segment is substantially compensated for by the greater refractive index of the higher index polymer.

4. A process according to claim 1 which further includes the step of back surfacing the bifocal lens after the post-cure.

5. A process according to claim 1 wherein the mould and lens or lens blank are held in position relative to one another by a clamping means which applies a clamping force to the periphery of the lens or lens blank.

6. A process according to claim 5 wherein the clamping force is applied to the periphery of the lens or lens blank by a flat plate.

7. A process according to claim 2 wherein the lens or lens blank contacts the mould around substantially an entire common periphery thereof so as to permit curing of the monomer in the absence of air.

8. A process according to claim 1 wherein the front surface of the cured monomer cast on the lens or lens blank has a near vision portion in the form of a segment and a distance vision portion surrounding the near vision portion.

9. A process according to claim 1 wherein a gap is provided between the mould and the lens or lens blank along a line where the optical axes of the mould and the lens or lens blank are substantially aligned.

10. A process according to claim 9 wherein the gap has a length of around 1.5 mm.

* * * * *